United States Patent
Almubarak et al.

(10) Patent No.: US 12,371,602 B2
(45) Date of Patent: Jul. 29, 2025

(54) MULTIFUNCTIONAL WASTE ADDITIVES FOR SUBTERRANEAN FORMATION TREATMENT FLUIDS, AND METHODS AND SYSTEMS RELATED THERETO

(71) Applicant: SAUDI ARABIAN OIL COMPANY, Dhahran (SA)

(72) Inventors: Tariq Abdulsattar Almubarak, Dhahran (SA); Abdulaziz Alghamdi, Dhahran (SA); Majid Mohammadkamal Rafie, Dhahran (SA); Fares Majed Alotaibi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/486,062

(22) Filed: Oct. 12, 2023

(65) Prior Publication Data
US 2025/0122415 A1    Apr. 17, 2025

(51) Int. Cl.
*C09K 8/10*    (2006.01)

(52) U.S. Cl.
CPC ............ *C09K 8/10* (2013.01); *C09K 2208/32* (2013.01)

(58) Field of Classification Search
CPC . C09K 8/10; E21B 43/16; E21B 33/16; E21B 33/26
See application file for complete search history.

(56) References Cited

U.S. PATENT DOCUMENTS

| | | | |
|---|---|---|---|
| 5,435,941 A | 7/1995 | Von Fraunhofer | |
| 10,072,339 B2 | 9/2018 | Krasnow et al. | |
| 11,485,897 B1 * | 11/2022 | Wang | C09K 8/575 |
| 2014/0119984 A1 * | 5/2014 | Belakshe | C23F 11/04 422/12 |
| 2017/0267913 A1 * | 9/2017 | Sarda-Mantri | C09K 8/74 |
| 2020/0369951 A1 | 11/2020 | Quraishi et al. | |

FOREIGN PATENT DOCUMENTS

| | | |
|---|---|---|
| CN | 101985693 A | 3/2011 |

OTHER PUBLICATIONS

Juantao Zhang, Jun Zhao, Ningsheng Zhang, Chengtun Qu, and Xiang Zhang, Synergized Action of CuCl on Recycled Cigarette Butts as Corrosion Inhibitor for N80 Steel at 90° C. in 15% HCl, Industrial & Engineering Chemistry Research 2011 50 (12), 7264-7272.

Saviour A. Umoren & Moses M. Solomon & Ime B. Obot & Rami K. Suleiman, 2021, Effect of Intensifier Additives on the Performance of Butanolic Extract of Date Palm Leaves against the Corrosion of API 5L X60 Carbon Steel in 15 wt. % HCl Solution, Sustainability, MDPI, vol. 13(10), pp. 1-22, May.

Li, X., Zhang, J., Song, W., Chang, Z., Han, Y., Cai, R. (2018). Cigarette Butts Water Extracts as Corrosion Inhibitor in Oil Field Acidizing Fracture Using Different Metal Chlorides Intensifiers. In: Han, Y. (eds) Advances in Materials Processing. CMC 2017. Lecture Notes in Mechanical Engineering. Springer, Singapore.

Jun Zhao, Ningsheng Zhang, Chengtun Qu, Xinmin Wu, Juantao Zhang, and Xiang Zhang, Cigarette Butts and Their Application in Corrosion Inhibition for N80 Steel at 90° C. in a Hydrochloric Acid Solution, Industrial & Engineering Chemistry Research 2010 49 (8), 3986-3991.

Zhao, Jun et al. "Comparison of the Corrosion Inhibitive Effect of Anaerobic and Aerobic Cigarette Butts Water Extracts on N80 Steel at 90° C. in Hydrochloric Acid Solution." Industrial & Engineering Chemistry Research 49 (2010): 12452-12460.

Hemamalini, T., Santhosh Ayalur Karunakaran, M. Elango, T. Senthilram and Venkateshwarapuram Rengaswami Giri Dev. "Regeneration of cellulose acetate nanofibrous mat from discarded cigarette butts." (2019).

Babu, Penugonda Suresh and Huzaifah Abdul Rahman. Study of Cigarette Butts Extract as Corrosiveinhibiting Agent in J55 Steel Material, International Journal of Research in Engineering and Technology 03 (2014): 444-452.

\* cited by examiner

*Primary Examiner* — Silvana C Runyan
(74) *Attorney, Agent, or Firm* — Vorys, Sater, Seymour and Pease LLP

(57) ABSTRACT

Treatment fluids, systems, and methods including preparing a multifunctional waste additive (MWA) comprising a cellulose extract derived by contacting a plurality of cigarette filter waste with a solvent; preparing a treatment fluid comprising: a base fluid; an acid; a corrosion intensifier; and the MWA; introducing the treatment fluid into a wellbore drilled through a subterranean formation, the treatment fluid; and allowing the MWA to interact with at least a portion of a metal surface during the introducing.

20 Claims, 1 Drawing Sheet

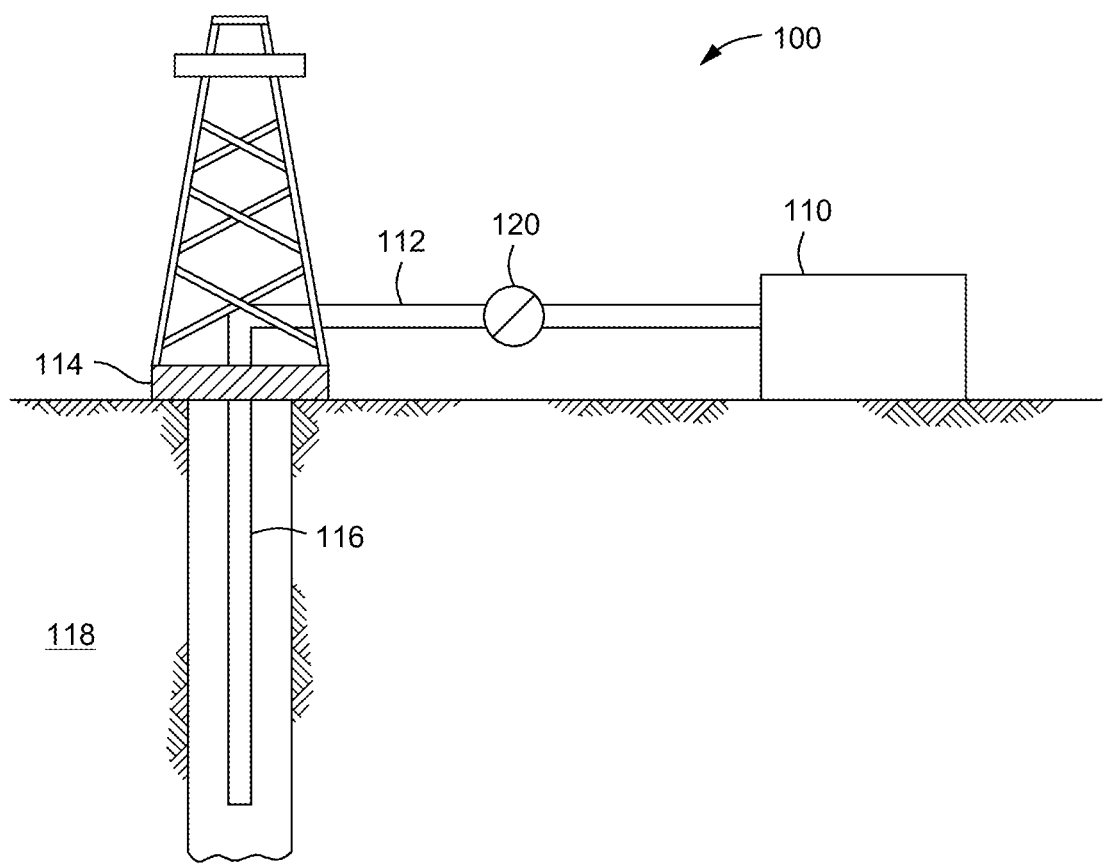

MULTIFUNCTIONAL WASTE ADDITIVES FOR SUBTERRANEAN FORMATION TREATMENT FLUIDS, AND METHODS AND SYSTEMS RELATED THERETO

FIELD OF INVENTION

The present disclosure relates generally to compositions, methods, and systems for use in the oil and gas industry, and more particularly, to compositions, methods, and systems related to subterranean formation treatment fluids comprising multifunctional waste additives.

BACKGROUND

The production of crude oil and other hydrocarbons begins with the drilling of a wellbore through a subterranean formation and into a hydrocarbon reservoir. Drilling of a wellbore generally involves circulating a drilling treatment fluid (or mud) from a surface location of the wellbore to a downhole location through a drill string. The drilling treatment fluid exits through ports (or jets) in a drill bit, which bores through the formation and forms the wellbore. The drilling treatment fluid aids in cooling and lubricating the drill bit and further picks up cuttings and carries the cuttings up an annulus formed between an inner wall of the wellbore and an outer wall of the drill string. The drilling fluid and the cuttings flow through the annulus to the surface, where the cuttings are separated from the fluid.

The wellbore may be isolated from the surrounding subterranean formation using a completion cementing operation. During a cementing operation, a cement sheath is placed within a wellbore between the subterranean formation and a casing (or liner string). The cement sheath is formed by pumping a cement treatment fluid (or slurry) through the bottom of the casing and out through the annulus between the outer casing wall and the formation face of the wellbore. The cement treatment fluid then cures in the annular space, thereby forming a sheath of hardened cement that, among other functions, supports and positions the casing in the wellbore and bonds the exterior surface of the casing to the subterranean formation.

After drilling and completion operations have concluded in a subterranean formation, the wellbore may be stimulated using a stimulation operation (including enhanced oil recovery options) to produce and/or improve hydrocarbon productivity therethrough. During a stimulation operation, a stimulation treatment fluid may be used to induce hydrocarbon production, such as by fracturing the subterranean formation (e.g., hydraulic fracturing), acidizing the subterranean formation (e.g., to clean rock pores and increase permeability), flooding (e.g., water, chemical, or gas flooding) of the subterranean formation, and any combination thereof.

In each of the aforementioned subterranean formation operations, the various treatment fluids may form or encounter a corrosive environment. Indeed, the treatment fluids may comprise an oxidizer (e.g., a chemical oxidizer, an electrochemical oxidizer) and cause corrosion of metal equipment and components. Traditionally, one or more corrosion inhibitors is included in the treatment fluids to prevent or reduce corrosion due to the use of such treatment fluids in various subterranean formation operations, particularly when the treatment fluid is acidic. While such traditional corrosion inhibitors are useful in controlling corrosion, certain disadvantages to their use exists, such as high costs, environmental toxicity and pollution, and degradation difficulty or inability.

In light of the aforementioned issues with current corrosion inhibitors, it is desirable to have improved corrosion inhibitors to control corrosion within a hydrocarbon-bearing wellbore.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

In one or more aspects, the present disclosure provides a method including preparing a multifunctional waste additive (MWA) comprising a cellulose extract derived by contacting a plurality of cigarette filter waste with a solvent; preparing a treatment fluid comprising: a base fluid; an acid; a corrosion intensifier; and the MWA; introducing the treatment fluid into a wellbore drilled through a subterranean formation, the treatment fluid; and allowing the MWA to interact with at least a portion of a metal surface during the introducing.

In another aspect, the present disclosure provides a system including a pump fluidly coupled to a tubular, the tubular extending into a wellbore drilled through a subterranean formation and containing a treatment fluid, the treatment fluid comprising: a base fluid; an acid; a corrosion intensifier; and a multifunctional waste additive (MWA) comprising a cellulose extract derived by solvent extraction of a plurality of cigarette filter waste.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

The FIG. 1s a schematic drawing of a system that can deliver the treatment fluids comprising the multifunctional waste additives described herein to a subterranean (downhole) location, according to one or more aspects of the present disclosure.

DETAILED DESCRIPTION

The present disclosure relates generally to compositions, methods, and systems for use in the oil and gas industry, and more particularly, to compositions, methods, and systems related to subterranean formation treatment fluids comprising multifunctional waste additives.

The present disclosure provides multifunctional waste additives ("MWAs") for upstream subterranean formation operations in the oil and gas industry, including drilling operations, completion operations, and stimulation operations. The MWAs advantageously provide an environmentally friendly partial or total substitute for the use of otherwise environmentally harmful conventional corrosion inhibitors when introducing corrosive chemicals into a subterranean formation for hydrocarbon recovery. Indeed, the MWAs utilize waste products that often are landfilled. Advantageously, the MWAs described herein further are cost-effective, reducing or eliminating costs associated with relatively expensive conventional corrosion inhibitors.

The MWAs of the present disclosure may be used in various upstream subterranean formation operations. Such subterranean formation operations may include any operation in which corrosive treatment fluids are used (e.g., comprising a corrosive chemical or contacting a corrosive environment) that may cause corrosion of metals (e.g., downhole or surface equipment surfaces and components) due to chemical or electrochemical reaction, including in high temperature subterranean formations (e.g., up to about 350° F. (~176.7° C.)). Corrosive treatment fluids may further result in formation damage, which can alter the properties of a subterranean formation, such as by reducing permeability, compromising geomechanical integrity, enhancing fines generation, and the like. Examples of upstream subterranean formation operations in which the MWAs of the present disclosure may be used in a treatment fluid to combat corrosion include, but are not limited to, a drilling operation, a cementing operation, a fracturing operation, an acid-fracturing operation, an acidizing operation, an enhanced oil recovery operation (e.g., a water, chemical, or gas flooding operation), and any combination thereof.

It is to be appreciated that while the current application primarily discusses the MWAs with reference to upstream oil and gas subterranean formation operations, the MWAs may additionally, and without limitation, be used in downstream applications. For example, the MWAs may be included in acidic or non-acidic fluids in downstream operations to maintain equipment tubing and related components' (e.g., piping equipment and components) integrity through which the acidic fluids flow or non-acidic fluids flow (e.g., in the case of scale build-up, such as oxidized iron scale-rust present in piping equipment and components).

Accordingly, the MWAs of the present disclosure offer an environmentally friendly partial or total substitute for the use of otherwise environmentally harmful conventional corrosion inhibitors to combat corrosion within a corrosive environment, whether such corrosive environment is located within a subterranean formation, pipeline, or other equipment or presented by the treatment fluid itself.

Definitions

As used herein, the term "subterranean formation," and grammatical variants thereof, refers to naturally occurring rock beneath the Earth's surface, including subsea surfaces. Subterranean formations may be formed from a variety of natural rock including, but not limited to, carbonate-based rock (e.g., calcium carbonate ($CaCO_3$)), calcium magnesium carbonate ($CaMg(CO_3)_2$) (also referred to as dolomite), sandstone-based rock comprising clays (e.g., smectite, illite, kaolinite, chlorite, and the like) and minerals (e.g., silica) and the like, and any combination thereof). The subterranean formations described herein encompass reservoir zones (i.e., zones comprising hydrocarbons (oil and/or gas)) and non-reservoir zones (i.e., zones that do not comprise hydrocarbons, such as water-producing zones).

As used herein, the term "subterranean formation operation," and grammatical variants thereof, refers to any operation involved in the drilling, completion, and/or production of hydrocarbons in an oil and gas wellbore within a subterranean formation.

As used herein, the term "wellbore," and grammatical variants thereof, refers to a drilled hole or borehole penetrating a subterranean formation, which may be cased (cemented) or uncased (openhole).

As used herein, the term "treatment fluid," and grammatical variants thereof, refers generally to any fluid that may be used in a subterranean formation operation in conjunction with a desired function and/or purpose. In general, the treatment fluids comprising the MWAs described herein comprise one or more MWAs to combat corrosion in a corrosive environment.

As used herein, the term "base fluid," and grammatical variants thereof, refers to a major fluid component (e.g., liquid, gas, emulsion) of a treatment fluid, as opposed to various components dissolved or suspended therein.

As used herein, the term "corrosive environment," and grammatical variants thereof, are used interchangeably and refer to an environment prone to cause corrosion of a metal surface. Such corrosive environments may include, but are not limited to, acidic environments; environments containing water in the presence of air and/or oxygen; environments comprising chloride or bromide ions, carbon dioxide, and/or hydrogen sulfide; and the like. A treatment fluid may itself present a corrosive environment to a metal surface (e.g., by comprising an acid or one of the aforementioned oxidizing chemicals).

As used herein, the term "corrosion," and grammatical variants thereof, refers to the process of oxidizing (e.g., by chemical or electrochemical means) a metal surface, thereby damaging the metal surface. The term "corrosion," as used herein, encompasses scale formation.

As used, herein, the term "corrosion inhibitor," and grammatical variants thereof, refers to a substance that reduces the corrosion rate or prevents corrosion of a metal surface exposed to a corrosive environment by its chemical activity.

As used herein, the term "cellulose-based cigarette filter," and grammatical variants thereof, refers to waste cigarette end filters that comprise a cellulosic material, which is generally primarily cellulose acetate. As used herein, the term "cigarette filter" is used interchangeably with and refers to "cellulose-based cigarette filter."

As used herein, the term "solvent," and grammatical variants thereof, refers to a flowable (e.g., generally liquid) substance that is able to dissolve another substance, namely a cellulosic material forming a cigarette filter as described herein.

As used herein, the term "supercritical," and grammatical variants thereof, refers to a flowable substance (e.g., solvent) having a temperature and pressure above its critical point, where distinct liquid and gas phases do not exist.

As used herein, the term "azeotrope," and grammatical variants thereof, refers to a flowable mixture (e.g., organic solvent mixture) having the same level of concentration in liquid and vapor phase. Simple distillation cannot alter their composition and the mixture can have a higher or lower boiling point compared to the components.

As used herein, the term "intensifier," and grammatical variants thereof, refers to a substance that is able to intensify the corrosion inhibition ability of a corrosion inhibitor. The intensifier acts as an inhibitor aid or synergistic with a corrosion inhibitor to upgrade the performance of the corrosion inhibitor.

MWA Treatment Fluids and Methods

As provided above, the MWAs of the present disclosure offer an environmentally friendly inhibitor that combats corrosion within corrosive environments as defined herein, including as a metal corrosion (including scale) inhibitor and a hydrogen sulfide scavenger. The MWAs are formed from chemical extraction of waste remains of cellulose-based cigarette filters.

Cigarette filters (or cigarette butts) are an abundant form of plastic waste polluting the global environment. Indeed, it is estimated that over 750,000 metric tons of cigarette filters make their way into the global environment annually and represent the most frequently littered item found in U.S. beaches and waterways. Such large amount of waste cigarette filters globally pollutes water, air, and land with toxic chemicals, heavy metals, and residual nicotine. For example, cigarette filters comprise cellulose acetate, a synthetic plastic material that contains known toxic chemicals. Waste cigarette filters can take up to 10 years to completely degrade, and during degradation they release these toxic chemicals, which can remain in the environment for many years past the life of the cigarette filter itself. Such toxic chemicals include, for example, arsenic and lead. Arsenic and lead are known toxins that can cause short-term and long-term harm in humans, non-human animals, and vegetation including inhibition of growth, inhibition of reproduction, and death, among others. Accordingly, the present disclosure provides an environmentally friendly, and profitable, means of reducing (by recycling) cigarette filter waste.

The MWAs are formed by contacting cellulose-based cigarette filters with a liquid solvent to produce a cellulose extract. The solvent may include an organic-based solvent or a water-based solvent. For example, examples of suitable organic-based solvents may include, but are not limited to, ethanol, methanol, isopropyl alcohol, glycerol, propylene glycol, polyethylene glycol, n-hexane, dichloromethane, trichloromethane, an azeotrope, any variant thereof, and the like, and any combination thereof. Examples of suitable water-based solvents may include, but are not limited to, fresh water, distilled water, purified wastewater, purified produced water, an azeotrope, or a supercritical variant thereof, and any combination thereof. In preferred embodiments, the solvent is organic-based to achieve extraction of a maximum amount of polar and non-polar compounds from the cigarette filters.

In some embodiments, the solvent has a purity of equal to or greater than about 90%, or preferably equal to or greater than about 95%, such as about 70% to about 100%, encompassing any value and subset therebetween, such as about 70% to about 71%, or about 71% to about 72%, or about 72% to about 73%, or about 73% to about 74%, or about 74% to about 75%, or about 75% to about 76%, or about 76% to about 77%, or about 77% to about 78%, or about 78%, to about 79%, or about 79% to about 80%, or about 80% to about 81%, or about 81% to about 82%, or about 82% to about 83%, or about 83% to about 84%, or about 84% to about 85%, or about 85% to about 86%, or about 86% to about 88%, or about 87% to about 88%, or about 88% to about 89%, or about 89% to about 90%, or about 90% to about 91%, or about 91% to about 92%, or about 92% to about 93%, or about 93% to about 94%, or about 94% to about 95%, or about 95% to about 96%, or about 96% to about 97%, or about 97% to about 98%, or about 98% to about 99%, or about 99% to about 100%, or about 90% to about 95%, or about 95% to about 100%, or about 96% to about 100%, or about 97% to about 100%, or about 98% to about 100%.

In one or more aspects of the present disclosure, the extraction occurs in the presence of one or more selected solvents via an extraction process including mechanical extraction (e.g., mechanical pressing, grinding, or other applied force), percolation extraction (e.g., continual application of fresh solvent), azeotrope fluid extraction (e.g., use of an azeotrope solvent), supercritical fluid extraction (e.g., use of a supercritical solvent), soaking extraction (e.g., prolonged emersion, temperature expedited emersion, and the like), Soxhlet extraction, and the like, and any combination thereof.

Additional mechanical equipment may be used in combination with the extraction method selected to facilitate cellulose extraction. Such equipment may include, but is not limited to, glass boiling chips, agitation devices (e.g., stirrer, shaker), and the like, and any combination thereof.

The selected extraction method(s) may be repeated without limitation to achieve the desired concentration of cellulose extract, including removal of polar and/or nonpolar (preferably both) compounds, for use in a treatment fluid, as described herein. For example, the extraction method may be repeated through several flushes over several days.

In one or more embodiments, regardless of the extraction method selected, extraction is performed at a temperature above the freezing point of the solvent in order to achieve effective extraction of the active chemical compounds in the cigarette filters (e.g., cellulose extract). The particular extraction temperature will depend on the selected solvent(s) and, in some embodiments, may be in the range of about −100° F. (~−73° C.) to about 650° F. (~343° C.), encompassing any value and subset therebetween, such as in the range of about −100° F. to about 0° F., or about 0° F. to about 100° F., or about 100° F. to about 200° F., or about 200° F. to about 300° F., or about 300° F. to about 400° F., or about 400° F. to about 500° F., or about 500° F. to about 600° F., or about 150° F. to about 600° F., or about 300° F. to about 650° F., or about 350° F. to about 650° F., or about 200° F. to about 350° F.

While the extraction is performed at a temperature above the boiling point of the solvent, in some instances, using a temperature below the boiling point (e.g., choosing an extraction temperature at or just below the boiling point) may lend itself positively for preservation of volatile sulfur molecules that demonstrate effectiveness in preventing corrosion from organic acids (e.g., formic acid, acetic acid) and chelating agents (e.g., ethylenediaminetetraacetic acid (EDTA), hydroxyethylethylenediaminetriacetic acid (HEDTA), diethylenetriaminepentaacetic acid (DTPA), nitrilotriacetic acid (NTA), tetrasodium glutamate diacetate (GLDA), methylglycinediacetic acid), and the like, and any combination thereof.

Notably, the cigarette butt filters of the present disclosure are waste products that are acquired after the cigarette has been burned at high temperature and undergone combustion, the result of which is generation of a variety of compounds composed of functional chemistries, such as benzene, aromatic amines, polyamines, and an assortment of hydrocarbons. Indeed, a cocktail of over 5,000 chemicals is generated from burning cigarettes. These functional chemistries aid in the use of the cellulosic extracted MWAs as effective corrosion inhibitors and hydrogen sulfide scavengers.

As provided herein, the MWAs of the present disclosure may be included in a treatment fluid to facilitate performance of a subterranean formation operation. The treatment fluid may comprise a base fluid, MWAs, an intensifier, and an acid.

The base fluid may include, but is not limited to, an aqueous base fluid, an aqueous-miscible base fluid, an oil base fluid, a water-in-oil emulsion base fluid, an oil-in-water emulsion base fluid, and any combination thereof.

Suitable aqueous base fluids may include, but are not limited to, fresh water, saltwater, brine, seawater, wastewater, purified wastewater, and the like, and any combination thereof.

Examples of suitable aqueous-miscible base fluids may include, but are not limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, any in combination with salts, and any combination thereof.

Examples of suitable oil base fluids may include, but are not limited to, alkanes, olefins, aromatic organic compounds, xylenes, cyclic alkanes, paraffins, diesel fluids, mineral oils, desulfurized hydrogenated kerosenes, and any combination thereof.

Suitable examples of water-in-oil emulsion base fluids may include, but are not limited to, base fluids having an oil-to-water ratio from a lower limit of greater than about 50:50 to an upper limit of less than about 100:0 by volume in the base fluid, encompassing any value and subset therebetween. Conversely, suitable examples of oil-in-water emulsion base fluids may include, but are not limited to, base fluids having a water-to-oil ratio from a lower limit of greater than about 50:50 to an upper limit of less than about 100:0 by volume in the base fluid, encompassing any value and subset therebetween.

The treatment fluids of the present disclosure comprise the MWAs prepared as described herein. The particular MWAs selected may depend on a number of factors including, but not limited to, the acid included in the treatment fluid (e.g., straight acid, emulsified acid, viscoelastic acid), the metal encountered by the treatment fluid, and the like, and any combination thereof. In one or more instances, the MWAs may be included in the treatment fluids of the present disclosure in an amount in the range of about 1 gallon per thousand gallons (gpt) to about 100 gpt of the treatment fluid, encompassing any value and subset therebetween, such as in the range of about 1 gpt to about 10 gpt, or about 10 gpt to about 20 gpt, or about 20 gpt to about 30 gpt, or about 30 gpt to about 40 gpt, or about 40 gpt to about 50 gpt, or about 50 gpt to about 60 gpt, or about 60 gpt to about 70 gpt, or about 70 gpt to about 80 gpt, or about 80 gpt to about 90 gpt, or about 90 gpt to about 100 gpt.

The treatment fluids of the present disclosure include an intensifier to enhance the surface corrosion inhibition of the MWAs in the treatment fluids, such as through the deposition of a coating on the surface of a metal (e.g., a metal located within a wellbore in a subterranean formation). For instance, and without being bound by theory, the intensifier may surround the MWAs to enhance contact between a metal and the MWAs. Examples of suitable intensifiers may include, but are not limited to, potassium iodide (KI), cuprous chloride (CuCl), cupric chloride ($CuCl_2$), cuprous iodide, a terpene, a chrome-based solution, an antimony salt, an organic acid (e.g., formic acid), and the like, and any combination thereof. In one or more embodiments, the intensifier may be present in the treatment fluids described herein in an amount in the range of about 0.2% by weight (wt %) to about 10 wt % of the treatment fluid, encompassing any value and subset therebetween, such as about 0.2 wt % to about 1 wt %, or about 1 wt % to about 2 wt %, or about 2 wt % to about 3 wt %, or about 3 wt % to about 4 wt %, or about 4 wt % to about 5 wt %, or about 5 wt % to about 6 wt %, or about 6 wt % to about 7 wt %, or about 7 wt % to about 8 wt %, or about 8 wt % to about 9 wt %, or about 9 wt % to about 10 wt %.

The treatment fluids of the present disclosure may comprise an acid, such as for performing an acid-fracturing, acidizing, or asphaltene removal subterranean formation operation, or for other subterranean formation operations where it is beneficial to include an acid. Generally, the MWAs are soluble or readily dispersible within the acid. Such acids may include, but are not limited to, an organic acid (e.g., formic acid, acetic acid, citric acid, lactic acid), a mineral acid (e.g., hydrochloric acid, hydrofluoric acid), and the like, and any combination thereof. In one or more embodiments, the acid may be included in the treatment fluids of the present disclosure in an amount in the range of about 1 wt % to about 28 wt % of the treatment fluid, encompassing any value and subset therebetween, 1 wt % to about 4 wt %, or about 4 wt % to about 8 wt %, or about 8 wt % to about 12 wt %, or about 12 wt % to about 16 wt %, or about 16 wt % to about 20 wt %, or about 20 wt % to about 24 wt %, or about 24 wt % to about 28 wt %, or about 14 wt % to about 16 wt %, or about 15 wt %.

In an example embodiment, the treatment fluids may utilize an emulsified acid, in which an emulsifier is added to a base fluid (e.g., an oil base fluid) followed by slow or low volume addition of the acid and additives while mixing vigorously over time.

In one or more instances, the treatment fluids of the present disclosure may further comprise one or more additives. Such additives may include, but are not limited to, a salt, an inert solid, a fluid loss control agent, a dispersion aid, a corrosion inhibitor (conventional), an emulsifier, an emulsion thinner, an emulsion thickener, a viscosifying agent, a gelling agent, a surfactant, a particulate, a proppant, a gravel particulate, a lost circulation material, a foaming agent, a gas, a breaker, a biocide, a crosslinker, a stabilizer, a chelating agent, a scale inhibitor, a gas hydrate inhibitor, a mutual solvent, an oxidizer, a reducer, a friction reducer, a clay stabilizing agent, an oxygen scavenger, a hydrogen sulfide scavenger, an anti-sludge agent, an iron control agent, and any combination thereof.

The MWAs in the treatment fluids of the present disclosure are effective corrosion inhibitors and, moreover, can function as hydrogen sulfide scavengers. The MWAs are effective upon contact with a variety of metal types typically used in the oil and gas industry, as further discussed in the Examples below. Such metal types may include, but are not limited to, low carbon steel types (e.g., J/K-55, N/L-80, C/T-95, P-110, Q-125), corrosion resistant metal alloys (e.g., Cr-13, Cr-12, nickel alloys), and the like, and any combination thereof.

Indeed, the treatment fluids comprising the MWAs of the present disclosure can inhibit corrosion below a specific corrosion rate over a six-hour period below at least 0.05 pounds per square foot ($lb/ft_2$). More particularly, the treatment fluids comprising the MWAs described herein meet corrosion inhibition standards in the oil and gas industry, including a corrosion rate over a six-hour period below 0.05 $lb/ft^2$ for low carbon steel, 0.02 $lb/ft^2$ for coiled tubing, and 0.03 $lb/ft^2$ for corrosion resistant alloys.

Systems

In various embodiments, systems configured for delivering the treatment fluids comprising the MWAs described herein to a downhole location within a subterranean formation are provided. In various embodiments, the systems can comprise a pump fluidly coupled to a tubular, the tubular containing the treatment fluids described herein.

The pump may be a high pressure pump in some embodiments. As used herein, the term "high pressure pump," and grammatical variants thereof, refers to a pump that is capable of delivering the treatment fluids downhole at a pressure of about 1000 psi or greater. A high pressure pump may be used when it is desired to introduce the treatment fluids to a subterranean formation at or above a fracture gradient of the subterranean formation, but it may also be used in cases where fracturing is not desired. In some embodiments, the high pressure pump may be capable of fluidly conveying solid particulate matter, such as the solid waste plastics and other solid additives described in some embodiments herein, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump," and grammatical variants thereof, refers to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluids to the high pressure pump. In such embodiments, the low pressure pump may "step up" the pressure of the treatment fluids before reaching the high pressure pump.

In some embodiments, the systems described herein can further comprise a mixing tank that is upstream of the pump and in which the treatment fluids are formulated. In various embodiments, the pump (e.g., a low pressure pump, a high pressure pump, or a combination thereof) may convey the treatment fluids from the mixing tank or other source of the treatment fluids to the tubular. In other embodiments, however, the treatment fluids may be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluids may be drawn into the pump, elevated to an appropriate pressure, and then introduced into the tubular for delivery downhole.

FIG. 1 shows an illustrative schematic of a system that can deliver the treatment fluids of the present disclosure to a downhole location, according to one or more embodiments. It should be noted that while FIG. 1 generally depicts a land-based system, it is to be recognized that like systems may be operated in subsea locations as well. As depicted in FIG. 1, system 100 may include mixing tank 110, in which the treatment fluids of the embodiments herein may be formulated. The treatment fluids may be conveyed via line 112 to wellhead 114, where the treatment fluids enter tubular 116, tubular 116 extending from wellhead 114 into subterranean formation 118. Upon being ejected from tubular 116, the treatment fluids may subsequently penetrate into subterranean formation 118. Pump 120 may be configured to raise the pressure of the treatment fluids to a desired degree before introduction into tubular 116. It is to be recognized that system 100 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

While various embodiments have been shown and described herein, modifications may be made by one skilled in the art without departing from the scope of the present disclosure. The embodiments described here are exemplary only, and are not intended to be limiting. Many variations, combinations, and modifications of the embodiments disclosed herein are possible and are within the scope of the disclosure. Accordingly, the scope of protection is not limited by the description set out above, but is defined by the claims which follow, that scope including all equivalents of the subject matter of the claims.

Nonlimiting Example Embodiments

Embodiments disclosed herein include:

Embodiment A: A method comprising: preparing a multifunctional waste additive (MWA) comprising a cellulose extract derived by contacting a plurality of cigarette filter waste with a solvent; preparing a treatment fluid comprising: a base fluid; an acid; a corrosion intensifier; and the MWA; introducing the treatment fluid into a wellbore drilled through a subterranean formation, the treatment fluid; and allowing the MWA to interact with at least a portion of a metal surface during the introducing.

Embodiment B: A system comprising: a pump fluidly coupled to a tubular, the tubular extending into a wellbore drilled through a subterranean formation and containing a treatment fluid, the treatment fluid comprising: a base fluid; an acid; a corrosion intensifier; and a multifunctional waste additive (MWA) comprising a cellulose extract derived by solvent extraction of a plurality of cigarette filter waste.

Each of embodiments A and B may have one or more of the following additional elements in any combination:

Element 1: wherein the solvent is selected from the group consisting of ethanol, methanol, isopropyl alcohol, glycerol, propylene glycol, polyethylene glycol, n-hexane, dichloromethane, trichloromethane, fresh water, distilled water, purified wastewater, purified produced water, an azeotrope, a supercritical variant thereof, and any combination thereof.

Element 2: wherein the solvent has a purity in the range of from about 70% to about 100%.

Element 3: wherein preparing the MWA comprising the cellulose extract derived by contacting the plurality of cigarette filter waste with the solvent comprises an extraction process selected from the group consisting of mechanical extraction, percolation extraction, azeotrope fluid extraction, supercritical fluid extraction, soaking extraction, Soxhlet extraction, and any combination thereof.

Element 4: further comprising preparing the MWA comprising the cellulose extract derived by contacting the plurality of cigarette filter waste with the solvent at a temperature in the range of about 100° F. to about 650° F.

Element 5: wherein the MFA is present in the treatment fluid in the range of about 1 gpt to about 100 gpt of the treatment fluid.

Element 6: wherein the acid is selected from the group consisting of an organic acid, a mineral acid, and any combination thereof.

Element 7: wherein the acid is present in the treatment fluid in the range of about 1 wt % to about 28 wt % of the treatment fluid.

Element 8: wherein the corrosion intensifier is selected from the group consisting of potassium iodide, cuprous chloride, cupric chloride, cuprous iodide, a terpene, a chrome-based solution, an antimony salt, an organic acid, and any combination thereof.

Element 9: wherein the corrosion intensifier is present in the treatment fluid in the range of about 0.2 wt % to about 10 wt % of the treatment fluid.

Element 10: wherein the MWA comprising the cellulose extract derived by contacting the plurality of cigarette filter waste with the solvent is prepared by an extraction process selected from the group consisting of mechanical extraction, percolation extraction, azeotrope fluid extraction, supercritical fluid extraction, soaking extraction, Soxhlet extraction, and any combination thereof.

Element 11: wherein the MWA comprising the cellulose extract derived by contacting the plurality of cigarette filter waste with the solvent is prepared at a temperature in the range of about 100° F. to about 650° F.

By way of non-limiting example, exemplary combinations applicable to A may include, but are not limited to: any one, more, or all of Elements 1-9 in any combination.

By way of non-limiting example, exemplary combinations applicable to A may include, but are not limited to: any one, more, or all of Elements 1, 2, 5-11 in any combination.

To facilitate a better understanding of the aspects of the present disclosure, the following examples of preferred or representative aspects are given. In no way should the following examples be read to limit, or to define, the scope of the disclosure.

Examples

EXAMPLE 1: In this Example, the corrosion rate inhibition efficiency of various corrosive treatment fluids were evaluated using cellulose extracts from various solvent types (experimental samples, E1-E4) or lacking a cellulose extract (control sample, C1). E1-E4 were dissolved in a solvent of fresh water, ethanol, methanol, or dichloromethane, respectively.

Corrosive treatment fluids were prepared by diluting HCl in fresh water to obtain a 15 wt % of HCl solution, followed by mixing 200 mL of the 15 wt % HCl solution with either 5 gpt of cellulose extract (E1-E4) or 0 gpt cellulose extract (C1). Each of the E1-E4 and C1 samples were then tested for corrosion rate inhibition efficiency as follows: (1) T-95 metal coupons with an area of 2.2 square inches ($in^2$) were cleaned, dried, and weighed, (2) a coupon was submerged separately in each of the E1-E4 and C1 samples and placed in a reactor vessel, (3) the reactor vessel was pressurized to 300 psi with nitrogen and heated to 150° F. (~65.6° C.) for 6 hours, and (4) the coupons were removed from the reactor vessel, cleaned, dried, and weighed to determine corrosion rate ($lb/ft^2$ per 6 hours). The results are shown in Table 1 below.

TABLE 1

| Sample | Description | Temp. (° F.) | Corrosion Rate ($lb/ft^2$ per 6 hours) |
|---|---|---|---|
| E1 | 200 mL 15 wt % HCl + 5 gpt water extract | 150 | 0.0390 |
| E2 | 200 mL 15 wt % HCl + 5 gpt ethanol extract | 150 | 0.0110 |
| E3 | 200 mL 15 wt % HCl + 5 gpt methanol extract | 150 | 0.0120 |
| E4 | 200 mL 15 wt % HCl + 5 gpt dichloromethane extract | 150 | 0.0220 |
| C1 | 200 mL 15 wt % HCl (no extract) | 150 | 0.1020 |

As shown, inclusion of the cellulose extract in the E1-E4 samples provided enhanced corrosion protection compared to the C1 sample, and far less than the industry maximum acceptable limit of 0.05 $lb/ft^2$ per 6 hours. Moreover, use of the alcohol based (E2 and E3) showed the most enhanced corrosion inhibition effects.

EXAMPLE 2: In this Example, the corrosion rate inhibition efficiency of various corrosive treatment fluids were evaluated using cellulose extracts from an ethanol solvent including a potassium iodide (KI) intensifier (experimental sample, E5), lacking a cellulose extract and an intensifier (control sample, C2), lacking a cellulose extract but including a KI intensifier (control sample, C3), or lacking an intensifier but including a cellulose extract (control sample, C4).

Corrosive treatment fluids were prepared by diluting HCl in fresh water to obtain a 15 wt % of HCl solution, followed by mixing 200 mL of the 15 wt % HCl solution with either 5 gpt of cellulose extract and 1 wt % KI intensifier (E5), 0 gpt of cellulose extract and 0 wt % intensifier (C2), 1 wt % KI intensifier only (C3), or 5 gpt cellulose extract only (C4). Each of the E5 and C2-C4 samples were then tested for corrosion rate inhibition efficiency as follows: (1) T-95 metal coupons with an area of 2.2 square inches ($in^2$) were cleaned, dried, and weighed, (2) a coupon was submerged separately in each of the E5 and C2-C4 samples and placed in a reactor vessel, (3) the reactor vessel was pressurized to 300 psi with nitrogen and heated to 200° F. (~93.3° C.) for 6 hours, and (4) the coupons were removed from the reactor vessel, cleaned, dried, and weighed to determine corrosion rate ($lb/ft^2$ per 6 hours). The results are shown in Table 2 below.

TABLE 2

| Sample | Description | Temp. (° F.) | Corrosion Rate ($lb/ft^2$ per 6 hours) |
|---|---|---|---|
| E5 | 200 mL 15 wt % HCl + 5 gpt cellulose extract + 1 wt % KI intensifier | 200 | 0.0010 |
| C2 | 200 mL 15 wt % HCl (no extract or intensifier) | 200 | 0.6420 |
| C3 | 200 mL 15 wt % HCl + 1 wt % KI intensifier (no extract) | 200 | 0.2320 |
| C4 | 200 mL 15 wt % HCl + 5 gpt cellulose extract (no intensifier) | 200 | 0.1012 |

As shown, the addition an intensifier (e.g., KI in this Example) in the E5 sample significantly improved the corrosion rate well below the industry maximum level of 0.05 $lb/ft^2$ per 6 hours compared to the C2-C4 samples at the higher temperature of 200° F. (as compared to the lower temperature of 150° F. evaluated in Example 1 above).

EXAMPLE 3: In this Example, the corrosion rate inhibition efficiency of various corrosive treatment fluids were evaluated using cellulose extracts from an ethanol solvent including a combination of potassium iodide (KI) intensifier and cuprous chloride (CuCl) (experimental sample, E6), lacking a cellulose extract but including KI intensifier and a CuCl intensifier (control sample, C5), lacking any intensifier but including a cellulose extract (control sample, C6), or lacking a cellulose extract and an intensifier (C7).

Corrosive treatment fluids were prepared by diluting HCl in fresh water to obtain a 15 wt % of HCl solution, followed by mixing 200 mL of the 15 wt % HCl solution with either 5 gpt of cellulose extract, 0.5 wt % KI intensifier, and 0.5 wt % CuCl intensifier (E6); 0.5 wt % KI intensifier and 0.5 wt % CuCl intensifier only (C5); 5 gpt cellulose extract only (C6); and 0 gpt of cellulose extract and 0 wt % intensifier (C7). Each of the E6 and C5-C7 samples were then tested for corrosion rate inhibition efficiency as follows: (1) T-95 metal coupons with an area of 2.2 square inches (in$^2$) were cleaned, dried, and weighed, (2) a coupon was submerged separately in each of the E6 and C5-C7 samples and placed in a reactor vessel, (3) the reactor vessel was pressurized to 300 psi with nitrogen and heated to 250° F. (~121.1° C.) for 6 hours, and (4) the coupons were removed from the reactor vessel, cleaned, dried, and weighed to determine corrosion rate (lb/ft$^2$ per 6 hours). The results are shown in Table 3 below.

TABLE 3

| Sample | Description | Temp. (° F.) | Corrosion Rate (lb/ft$^2$ per 6 hours) |
|---|---|---|---|
| E6 | 200 mL 15 wt % HCl + 5 gpt cellulose extract + 0.5 wt % KI intensifier + 0.5 wt % CuCl intensifier | 250 | 0.0059 |
| C5 | 200 mL 15 wt % HCl + 0.5 wt % KI intensifier + 0.5 wt % CuCl intensifier (no extract) | 250 | 0.0261 |
| C6 | 200 mL 15 wt % HCl + 5 gpt cellulose extract (no intensifier) | 250 | 0.7430 |
| C7 | 200 mL 15 wt % HCl (no extract and no intensifier) | 250 | Completely Dissolved |

As shown, the addition of an intensifier combination (e.g., KI and CuCl in this Example) in the E6 sample significantly improved the corrosion rate well below the industry maximum level of 0.05 lb/ft$^2$ per 6 hours compared to the C5-C6 samples at the higher temperature of 250° F. (as compared to the lower temperature of 150° F. and 200° F. evaluated in Examples 1 and 2 above, respectively). Moreover, the provision of intensifier combination alone (sample C5) additionally resulted in a corrosion rate well below the industry maximum level.

EXAMPLE 4: In this Example, the corrosion rate inhibition efficiency of various corrosive treatment fluids were evaluated using cellulose extract from an ethanol solvent including a combination of potassium iodide (KI) intensifier and cuprous copper iodide (CuI) (experimental sample, E7), or lacking a cellulose extract but including KI intensifier and a CuI intensifier (control sample, C8).

Corrosive treatment fluids were prepared by diluting HCl in fresh water to obtain a 15 wt % of HCl solution, followed by mixing 200 mL of the 15 wt % HCl solution with either 20 gpt of cellulose extract, 1 wt % KI intensifier, and 1 wt % CuI intensifier (E7); or 1 wt % KI intensifier and 1 wt % CuI intensifier only (C8). Each of the E7 and C8 samples were then tested for corrosion rate inhibition efficiency as follows: (1) T-95 metal coupons with an area of 2.2 square inches (in$^2$) were cleaned, dried, and weighed, (2) a coupon was submerged separately in each of the E7 and C8 samples and placed in a reactor vessel, (3) the reactor vessel was pressurized to 300 psi with nitrogen and heated to 250° F. (~121.1° C.) for 6 hours, and (4) the coupons were removed from the reactor vessel, cleaned, dried, and weighed to determine corrosion rate (lb/ft$^2$ per 6 hours). The results are shown in Table 4 below.

TABLE 4

| Sample | Description | Temp. (° F.) | Corrosion Rate (lb/ft$^2$ per 6 hours) |
|---|---|---|---|
| E7 | 200 mL 15 wt % HCl + 20 gpt cellulose extract + 1 wt % KI intensifier + 1 wt % CuI intensifier | 250 | 0.0008 |
| C8 | 200 mL 15 wt % HCl + 1 wt % KI intensifier + 1 wt % CuI intensifier (no extract) | 250 | 0.0788 |

As shown, the addition of a higher concentration of cellulose extract, in addition to an intensifier combination (e.g., KI and CuCl in this Example) at a higher concentration in the E7 sample significantly improved the corrosion rate well below the industry maximum level of 0.05 lb/ft$^2$ per 6 hours compared to the C8 sample at the high temperature of 250° F. (as compared to the lower concentration of cellulose extract and intensifier in Example 3 above).

EXAMPLE 5: In this Example, the corrosion rate inhibition efficiency of various corrosive treatment fluids were evaluated using cellulose extract from an ethanol solvent including a combination of potassium iodide (KI) intensifier and cupric chloride (CuCl$_2$) (experimental sample, E8) or lacking a cellulose extract but including KI intensifier and a CuCl$_2$ intensifier (control sample, C9).

Corrosive treatment fluids were prepared by diluting HCl in fresh water to obtain a 15 wt % of HCl solution, followed by mixing 200 mL of the 15 wt % HCl solution with either 20 gpt of cellulose extract, 1 wt % KI intensifier, and 1 wt % CuCl$_2$ intensifier (E8); or 1 wt % KI intensifier and 1 wt % CuCl$_2$ intensifier only (C8). Each of the E8 and C9 samples were then tested for corrosion rate inhibition efficiency as follows: (1) T-95 metal coupons with an area of 2.2 square inches (in$^2$) were cleaned, dried, and weighed, (2) a coupon was submerged separately in each of the E8 and C9 samples and placed in a reactor vessel, (3) the reactor vessel was pressurized to 300 psi with nitrogen and heated to 250° F. (~121.1° C.) for 6 hours, and (4) the coupons were removed from the reactor vessel, cleaned, dried, and weighed to determine corrosion rate (lb/ft$^2$ per 6 hours). The results are shown in Table 5 below.

(sample C9) additionally resulted in a corrosion rate well below the industry maximum level.

EXAMPLE 6: In this Example, the corrosion rate inhibition efficiency of various corrosive treatment fluids were evaluated using cellulose extract from an ethanol solvent including a combination of acid stimulation additives and a ferric iron to simulate subterranean formation acidizing conditions (experimental sample, E9); lacking a cellulose extract but including the combination of acid stimulation additives (control sample, C10); or lacking both the cellulose extract and the acid stimulation additives (control sample, C11).

Corrosive treatment fluids were prepared by diluting HCl in fresh water to obtain a 15 wt % of HCl solution, followed by mixing 200 mL of the 15 wt % HCl solution and 3000 ppm of ferric iron with either 5 gpt of cellulose extract and an "acid stimulation additive combination" comprising 0.24 wt % EDTA iron control additive, 0.06 wt % citric acid iron control additive, 1 wt % of surfactant additive (F103), 5 gpt H$_2$S scavenger additive (M295), 5 gpt of anti-sludge additive (W060), and 5 gpt of demulsifier additive (W054) (E9); the acid stimulation additive combination alone (C10); or 0 gpt of cellulose extract and 0 wt % acid stimulation additive combination (C11). Each of the E9, C10, and C11 samples were then tested for corrosion rate inhibition efficiency as follows: (1) T-95 metal coupons with an area of 2.2 square inches (in$^2$) were cleaned, dried, and weighed, (2) a coupon

TABLE 5

| Sample | Description | Temp. (° F.) | Corrosion Rate (lb/ft$^2$ per 6 hours) |
|---|---|---|---|
| E8 | 200 mL 15 wt % HCl + 20 gpt cellulose extract + 1 wt % KI intensifier + 1 wt % CuCl$_2$ intensifier | 250 | 0.0038 |
| C9 | 200 mL 15 wt % HCl + 1 wt % KI intensifier + 1 wt % CuCl$_2$ intensifier (no extract) | 250 | 0.0238 |

As shown, the addition of a higher concentration of cellulose extract, in addition to an intensifier combination (e.g., KI and CuCl$_2$ in this Example) at a higher concentration in the E8 sample significantly improved the corrosion rate well below the industry maximum level of 0.05 lb/ft$^2$ per 6 hours compared to the C9 sample at the high temperature of 250° F. (as compared to the lower concentration was submerged separately in each of the E8, C10, and C11 samples and placed in a reactor vessel, (3) the reactor vessel was pressurized to 300 psi with nitrogen and heated to 200° F. (~93.3° C.) for 6 hours, and (4) the coupons were removed from the reactor vessel, cleaned, dried, and weighed to determine corrosion rate (lb/ft$^2$ per 6 hours). The results are shown in Table 6 below.

TABLE 6

| Sample | Description | Temp. (° F.) | Corrosion Rate (lb/ft$^2$ per 6 hours) |
|---|---|---|---|
| E9 | 200 mL 15 wt % HCl + 3000 ppm ferric iron + 5 gpt cellulose extract + acid stimulation additive combination | 200 | 0.0392 |
| C10 | 200 mL 15 wt % HCl + 3000 ppm ferric iron + acid stimulation additive combination (no extract) | 200 | 0.5110 |
| C11 | 200 mL 15 wt % HCl + 3000 ppm ferric iron (no extract and no acid stimulation additive combination) | 200 | 0.6420 | of cellulose extract and intensifier in Example 3 above). Moreover, the provision of intensifier combination alone As shown, inclusion of the cellulose extract in the E9 sample provided enhanced corrosion protection compared to the C10 and C11 samples, and did not exceed the industry maximum acceptable limit of 0.05 lb/ft² per 6 hours. Indeed, the acid stimulation additives alone in the C10 sample failed to significantly impact the corrosion rate compared to the C11 sample.

EXAMPLE 7: In this Example, the corrosion rate inhibition efficiency of various corrosive treatment fluids were evaluated using dispersed cellulose extract from an ethanol solvent including a KI intensifier (experimental samples, E10 and E11); a non-dispersed cellulose extract including a KI intensifier (control sample, C12); or lacking both the cellulose extract and the KI intensifier (control sample, C13).

Experimental dispersed corrosive treatment fluids were prepared by diluting HCl in fresh water to obtain a 15 wt % of HCl solution, followed by mixing 200 mL of the 15 wt % HCl solution and 0.2 wt % KI intensifier with either 5 gpt of cellulose extract dispersed in 3 ml in 10 ml of dispersant (creating a 30 wt % solution of the dispersed corrosion inhibitor, 5 gpt equivalent is about 16.667 gpt of the dispersed solution and 2 gpt equivalent is 6.667 gpt of the dispersed final solution). The samples included a dispersant (ER0278) ("dispersed cellulose extract") (E10) or 2 gpt of the dispersed cellulose extract (E11). That is, although the cellulose extract is dispersed, the amount of cellulose extract itself is equivalent to 5 gpt (E10) and 2 gpt (E11).

Control (non-dispersed) corrosive treatment fluids were prepared with 200 mL of the 15 wt % HCl solution and either 5 gpt of (non-dispersed) cellulose extract and 0.2 wt % KI intensifier (C12) or 0 gpt cellulose extract and 0 wt % intensifier (C13).

Each of the E10, E11, C12, and C13 samples were then tested for corrosion rate inhibition efficiency as follows: (1) T-95 metal coupons with an area of 2.2 square inches (in²) were cleaned, dried, and weighed, (2) a coupon was submerged separately in each of the E10, E11, C12, and C13 samples and placed in a reactor vessel, (3) the reactor vessel was pressurized to 300 psi with nitrogen and heated to 200° F. (~93.3° C.) for 6 hours, and (4) the coupons were removed from the reactor vessel, cleaned, dried, and weighed to determine corrosion rate (lb/ft² per 6 hours). The results are shown in Table 7 below.

As shown, inclusion of the dispersed cellulose extract in the E10 sample provided enhanced corrosion protection compared to the equivalent C12 (non-dispersed) cellulose extract sample, and did not exceed the industry maximum acceptable limit of 0.05 lb/ft² per 6 hours. Additionally, at the lesser concentration of dispersed cellulose extract of 2 gpt, the E11 sample did not exceed the maximum acceptable limit.

EXAMPLE 8: In this Example, the corrosion rate inhibition efficiency of various emulsified corrosive treatment fluids were evaluated using cellulose extract from an ethanol solvent including a KI intensifier (experimental sample, E13); including only a KI intensifier (control sample, C14); or lacking both the cellulose extract and the KI intensifier (control sample, C15).

Experimental emulsified corrosive treatment fluid E13 was prepared by (1) preparing an aqueous phase by dissolving 5 gpt of cellulose extract and 0.5 wt % KI intensifier in 700 mL of 15 wt % HCl solution and (2) preparing an oil phase of 10 mL of cationic emulsifier (E-31) in 290 mL of diesel oil.

Control emulsified corrosive treatment fluid C14 was prepared by (1) preparing an aqueous phase by dissolving 0.5 wt % KI intensifier in 700 mL of 15 wt % HCl solution and (2) preparing an oil phase of 10 mL of cationic emulsifier (E-31) in 290 mL of diesel oil.

Control emulsified corrosive treatment fluid C15 was prepared by (1) preparing an aqueous phase of 15 wt % HCl solution and (2) preparing an oil phase of 10 mL of cationic emulsifier (E-31) in 290 mL of diesel oil.

For each of E13, C14, and C15, emulsions were formed by blending the oil phase at high shear rate of 1,000-2,000 RPM in a laboratory blender (available from Waring) and adding the aqueous phase in a dropwise matter using a separator funnel over a 30-minute time period. Thereafter, each of the E13, C12, 3, and C14 samples were then tested for corrosion rate inhibition efficiency as follows: (1) T-95 metal coupons with an area of 2.2 square inches (in²) were cleaned, dried, and weighed, (2) a coupon was submerged separately in each of the E13, C14, and C15 samples and placed in a reactor vessel, (3) the reactor vessel was pressurized to 300 psi with nitrogen and heated to 250° F. (~121.1° C.) for 6 hours, and (4) the coupons were removed from the reactor vessel, cleaned, dried, and weighed to determine corrosion rate (lb/ft² per 6 hours). The results are shown in Table 8 below.

TABLE 7

| Sample | Description | Temp. (° F.) | Corrosion Rate (lb/ft² per 6 hours) |
|---|---|---|---|
| E10 | 200 mL 15 wt % HCl + 0.2 wt % KI intensifier + 5 gpt dispersed cellulose extract | 200 | 0.0452 |
| E11 | 200 mL 15 wt % HCl + 0.2 wt % KI intensifier + 2 gpt dispersed cellulose extract | 200 | 0.0481 |
| C12 | 200 mL 15 wt % HCl + 0.2 wt % KI intensifier + 5 gpt cellulose extract (non-dispersed) | 200 | 0.0475 |
| C13 | 200 mL 15 wt % HCl (no extract and no intensifier) | 200 | 0.6420 |

TABLE 8

| Sample | Description | Temp. (° F.) | Corrosion Rate (lb/ft² per 6 hours) |
|---|---|---|---|
| E13 | Cationic emulsified 15 wt % HCl + 5 gpt cellulose extract + 0.5 wt % KI intensifier | 250 | 0.0245 |
| C14 | Cationic emulsified 15 wt % HCl + 0.5 wt % KI intensifier (no extract) | 250 | Completely Dissolved |
| C15 | Cationic emulsified 15 wt % HCl (no extract and no intensifier) | 250 | Completely Dissolved |

As shown, inclusion of the cellulose extract in a cationic emulsified corrosive treatment fluid of the E13 sample provided significant enhanced corrosion protection compared to both the C14 and C15 samples, and did not exceed the industry maximum acceptable limit of 0.05 lb/ft² per 6 hours.

EXAMPLE 9: In this Example, the corrosion rate inhibition efficiency of various emulsified corrosive treatment fluids were evaluated using cellulose extract from an ethanol solvent including a KI intensifier (experimental sample, E14); including only a KI intensifier (control sample, C16); or lacking both the cellulose extract and the KI intensifier (control sample, C17).

Experimental emulsified corrosive treatment fluid E14 was prepared by (1) preparing an aqueous phase by dissolving 5 gpt of cellulose extract and 0.5 wt % KI intensifier in 700 mL of 15 wt % HCl solution and (2) preparing an oil phase of 20 mL of non-ionic emulsifier (TERRAVIS™ SE70) in 290 mL of diesel oil. Without being bound by theory, cationic emulsifiers may work better at lower concentrations, but can cause incompatibility with other additives due to charge related interactions; thus non-ionic emulsifiers may be used in some instances to avoid this incompatibility.

Control emulsified corrosive treatment fluid C16 was prepared by (1) preparing an aqueous phase by dissolving 0.5 wt % KI intensifier in 700 mL of 15 wt % HCl solution and (2) preparing an oil phase of 20 mL of non-ionic emulsifier (TERRA VIS™ SE70) in 290 mL of diesel oil.

Control emulsified corrosive treatment fluid C17 was prepared by (1) preparing an aqueous phase of 15 wt % HCl solution and (2) preparing an oil phase of 20 mL of non-ionic emulsifier (TERRAVIS™ SE70) in 290 mL of diesel oil.

For each of E14, C16, and C17, emulsions were formed by blending the oil phase at high shear rate of 1,000-2,000 RMP in a laboratory blender (available from Waring) and adding the aqueous phase in a dropwise matter using a separator funnel over a 30-minute time period. Thereafter, each of the E13, C12, 3, and C14 samples were then tested for corrosion rate inhibition efficiency as follows: (1) T-95 metal coupons with an area of 2.2 square inches (in²) were cleaned, dried, and weighed, (2) a coupon was submerged separately in each of the E14, C16, and C17 samples and placed in a reactor vessel, (3) the reactor vessel was pressurized to 300 psi with nitrogen and heated to 250° F. (~121.1° C.) for 6 hours, and (4) the coupons were removed from the reactor vessel, cleaned, dried, and weighed to determine corrosion rate (lb/ft² per 6 hours). The results are shown in Table 9 below.

TABLE 9

| Sample | Description | Temp. (° F.) | Corrosion Rate (lb/ft² per 6 hours) |
|---|---|---|---|
| E14 | Nonionic emulsified 15 wt % HCl + 5 gpt cellulose extract + 0.5 wt % KI intensifier | 250 | 0.0296 |
| C16 | Nonionic emulsified 15 wt % HCl + 0.5 wt % KI intensifier (no extract) | 250 | Completely Dissolved |
| C17 | Nonionic emulsified 15 wt % HCl (no extract and no intensifier) | 250 | Completely Dissolved |

As shown, inclusion of the cellulose extract in a nonionic emulsified corrosive treatment fluid of the E14 sample provided significant enhanced corrosion protection compared to both the C16 and C17 samples, and did not exceed the industry maximum acceptable limit of 0.05 lb/ft² per 6 hours.

EXAMPLE 10: In this Example, the corrosion rate inhibition efficiency of corrosive treatment fluids comprising cellulose extract from an ethanol solvent upon contact with various metals: J-55 metal, K-55 metal, L-80 metal, T-95 metal, and P-110 metal.

Corrosive treatment fluids were prepared by diluting HCl in fresh water to obtain a 28 wt % of HCl solution, followed by mixing 200 mL of the 28 wt % HCl solution with either 5 gpt cellulose extract (experimental samples, E15-E19) or 0 gpt cellulose extract (control samples, C18-C22). Each of the E15-E9 and C18-C22 samples were tested for corrosion rate inhibition efficiency as follows: (1) metal coupons (as shown in Table 10) with an area of 2.2 square inches (in²) were cleaned, dried, and weighed, (2) a coupon was submerged separately in each of the E15-E19 and C18-C22 samples and placed in a covered beaker at room temperature (RT) (77° F. (25° C.)) for 6 hours, and (3) the coupons were removed from the beaker, cleaned, dried, and weighed to determine corrosion rate (lb/ft² per 6 hours). The results are shown in Table 10 below.

TABLE 10

| Sample | Metal | Description | Temp. (° F.) | Corrosion Rate (lb/ft² per 6 hours) | % Decrease |
|---|---|---|---|---|---|
| E15 | J-55 | 200 mL 28 wt % HCl + 5 gpt cellulose extract | 77 | 0.232 | 26.2% |
| C18 | J-55 | 200 mL 28 wt % HCl (no extract) | 77 | 0.3144 | — |
| E16 | K-55 | 200 mL 28 wt % HCl + 5 gpt cellulose extract | 77 | 0.2401 | 55.2% |
| C19 | K-55 | 200 mL 28 wt % HCl (no extract) | 77 | 0.5365 | — |
| E17 | L-80 | 200 mL 28 wt % HCl + 5 gpt cellulose extract | 77 | 0.3661 | 23.3% |
| C20 | L-80 | 200 mL 28 wt % HCl (no extract) | 77 | 0.4771 | — |
| E18 | T-95 | 200 mL 28 wt % HCl + 5 gpt cellulose extract | 77 | 0.0803 | 76.2% |
| C21 | T-95 | 200 mL 28 wt % HCl (no extract) | 77 | 0.3374 | — |
| E19 | P-110 | 200 mL 28 wt % HCl + 5 gpt cellulose extract | 77 | 0.2425 | 52.6% |
| C22 | P-110 | 200 mL 28 wt % HCl (no extract) | 77 | 0.5116 | — |

As shown, inclusion of the cellulose extract in each of the corrosive treatment fluids of the E15-E19 samples provided significant enhanced corrosion protection compared to all of the corresponding control samples C18-C22 regardless of the particular metal type, even at the high acid concentration of 28 wt %. The J-55 and T-95 metals contacted with the corrosive treatment fluids comprising cellulose extract exhibited particularly enhanced corrosion inhibition rates compared to corresponding control samples of greater than 75%.

EXAMPLE 11: In this Example, the corrosion rate inhibition efficiency of various corrosive treatment fluids were evaluated using cellulose extract from an ethanol solvent including a combination of KI intensifier and CuCl intensifier (experimental sample, E20), lacking a cellulose extract but including KI intensifier and a CuCl intensifier (control sample, C23), and lacking both a cellulose extract and an intensifier (control sample, C24).

Corrosive treatment fluids were prepared by diluting HCl in fresh water to obtain a 15 wt % of HCl solution, followed by mixing 200 mL of the 15 wt % HCl solution with either 20 gpt of cellulose extract, 2 wt % KI intensifier, and 2 wt % CuCl intensifier (E20); 2 wt % KI intensifier and 2 wt % CuCl intensifier only (C23); or 0 pgt cellulose extract and 0 wt % intensifier (C24). Each of the E20, C23, and C24 samples were then tested for corrosion rate inhibition efficiency as follows: (1) T-95 metal coupons with an area of 2.2 square inches (in²) were cleaned, dried, and weighed, (2) a coupon was submerged separately in each of the E20, C23, and C24 samples and placed in a reactor vessel, (3) the reactor vessel was pressurized to 300 psi with nitrogen and heated to 300° F. (~148.9° C.) for 6 hours, and (4) the coupons were removed from the reactor vessel, cleaned, dried, and weighed to determine corrosion rate (lb/ft² per 6 hours). The results are shown in Table 11 below.

As shown, the corrosive treatment fluid comprising the cellulose extract and intensifier combination of the C20 sample exhibits significantly improved corrosion inhibition at the higher temperature of 300° F. compared to both the C23 and C24 samples. Compare E20 and E7 having identical compositions at temperatures of 300° F. and 250° F. respectively, and C23 and C8 having identical compositions at temperatures of 300° F. and 250° F. respectively; in all samples, an increase in temperature reduces corrosion inhibition.

EXAMPLE 12: In this Example, the corrosion rate inhibition efficiency of various corrosive treatment fluids were evaluated using cellulose extract from an ethanol solvent including a combination of KI intensifier and cuprous iodide (CuI) intensifier (experimental sample, E21), lacking a cellulose extract but including KI intensifier and a CuI intensifier (control sample, C25), and lacking both a cellulose extract and an intensifier (control sample, C26).

Corrosive treatment fluids were prepared by diluting HCl in fresh water to obtain a 15 wt % of HCl solution, followed by mixing 200 mL of the 15 wt % HCl solution with either 60 gpt of cellulose extract, 4 wt % KI intensifier, and 4 wt % CuCl intensifier (E21); 4 wt % KI intensifier and 4 wt % CuCl intensifier only (C25); or 0 pgt cellulose extract and 0 wt % intensifier (C26). Each of the E21, C25, and C26 samples were then tested for corrosion rate inhibition efficiency as follows: (1) T-95 metal coupons with an area of 2.2 square inches (in²) were cleaned, dried, and weighed, (2) a coupon was submerged separately in each of the E21, C25, and C26 samples and placed in a reactor vessel, (3) the reactor vessel was pressurized to 300 psi with nitrogen and heated to 350° F. (~177.7° C.) for 6 hours, and (4) the coupons were removed from the reactor vessel, cleaned, dried, and weighed to determine corrosion rate (lb/ft² per 6 hours). The results are shown in Table 12 below.

TABLE 11

| Sample | Description | Temp. (° F.) | Corrosion Rate (lb/ft² per 6 hours) |
|---|---|---|---|
| E20 | 200 mL 15 wt % HCl + 20 gpt cellulose extract + 2 wt % KI intensifier + 2 wt % CuCl intensifier | 300 | 0.0102 |
| C23 | 200 mL 15 wt % HCl + 2 wt % KI intensifier + 2 wt % CuCl intensifier (no extract) | 300 | 0.7029 |
| C24 | 200 mL 15 wt % HCl (no extract and no intensifier) | 300 | Completely Dissolved |

TABLE 12

| Sample | Description | Temp. (° F.) | Corrosion Rate (lb/ft² per 6 hours) |
|---|---|---|---|
| E21 | 200 mL 15 wt % HCl + 60 gpt cellulose extract + 4 wt % KI intensifier + 4 wt % CuI intensifier | 350 | 0.0144 |
| C25 | 200 mL 15 wt % HCl + 4 wt % KI intensifier + 4 wt % CuI intensifier (no extract) | 350 | 0.4901 |
| C26 | 200 mL 15 wt % HCl (no extract and no intensifier) | 350 | Completely Dissolved |

As shown, the corrosive treatment fluid comprising the cellulose extract and intensifier combination of the E21 sample exhibits significantly improved corrosion inhibition at the higher temperature of 350° F. compared to both the C25 and C26 samples.

EXAMPLE 13: In this Example, the $H_2S$ scavenging efficiency (%) of various corrosive treatment fluids were evaluated using cellulose extract from an ethanol solvent (experimental sample, E22) and lacking a cellulose extract (control sample, C27).

A closed system comprising three (3) glass reactant vessels was set up to generate and capture $H_2S$ gas scavenging efficiency as follows: (1) the first vessel contained 1 gram (g) of iron sulfide (FeS) and 10 mL of 10 wt % HCl to produce about 1900 ppm $H_2S$ gas at RT, (2) the $H_2S$ gas was then pushed to the second vessel using $N_2$ gas, where the second vessel contained 200 mL of 15 wt % HCl and either 10 gpt cellulose extract (E22) or no cellulose extract (C27) at RT, (3) after 3 hours un-scavenged $H_2S$ gas was collected in the third vessel, where the third vessel contained 3 wt % cadmium sulfate ($CdSO_4$) to collect the un-scavenged $H_2S$ gas in the form of cadmium sulfide (CdS) solids, and (4) the weight of the CdS solids was obtained for the E22 and C27 samples to determine $H_2S$ scavenging efficiency using stoichiometry. The results are shown in Table 13.

TABLE 13

| Sample | Description | Temp. (° F.) | H2S Scavenging Efficiency (%) |
|---|---|---|---|
| E22 | 200 mL 15 wt % HCl + 10 gpt cellulose extract exposed to $H_2S$ gas | 77 | 78% |
| C27 | 200 mL 15 wt % HCl (no extract) exposed to $H_2S$ gas | 77 | 3% |

As shown, the corrosive treatment fluid comprising the cellulose extract of the E22 sample exhibits significantly improved $H_2S$ scavenging efficiency (78%) compared to both the C27 sample (only 3%).

Accordingly, the present disclosure provides for MFAs for use in treatment fluids encountering or creating a corrosive environment as a corrosion inhibitor, as well as beneficially a hydrogen sulfide scavenger.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains," "containing," "includes," "including," "comprises," and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized that these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and are not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by one or more embodiments described herein. At the very least, and not as an attempt to limit the application of the doctrine of equivalents to the scope of the claim, each numerical parameter should at least be construed in light of the number of reported significant digits and by applying ordinary rounding techniques.

What is claimed is:

1. A method comprising:
    preparing a multifunctional waste additive (MWA) consisting of a cellulose extract derived by contacting a plurality of cigarette filter waste with a solvent;
    preparing a treatment fluid comprising:
        a base fluid;
        an acid;
        a terpene corrosion intensifier;
        the MWA,
            wherein the treatment fluid excludes a metal-based corrosion intensifier; and
    introducing the treatment fluid into a wellbore drilled through a subterranean formation; and
    contacting the treatment fluid with at least a portion of a metal surface during the introducing,
thereby reducing a corrosion rate of the metal surface by at least about 50% to about 90%, as compared to a corresponding method excluding the MWA.

2. The method of claim 1, wherein the solvent is selected from the group consisting of ethanol, methanol, isopropyl alcohol, glycerol, propylene glycol, polyethylene glycol, n-hexane, dichloromethane, trichloromethane, fresh water, distilled water, purified wastewater, purified produced water, an azeotrope, a supercritical fluid, or any combination thereof.

3. The method of claim 1, wherein the solvent has a purity of about 70% to about 100%.

4. The method of claim 1, wherein preparing the MWA consisting of the cellulose extract derived by contacting the plurality of cigarette filter waste with the solvent comprises an extraction process selected from the group consisting of mechanical extraction, percolation extraction, azeotrope extraction, supercritical fluid extraction, soaking extraction, Soxhlet extraction, and any combination thereof.

5. The method of claim 1, further comprising preparing the MWA consisting of the cellulose extract derived by contacting the plurality of cigarette filter waste with the solvent at a temperature of about 100° F. to about 650° F.

6. The method of claim 1, wherein the MWA is present in the treatment fluid in an amount of about 1 gpt to about 100 gpt of the treatment fluid.

7. The method of claim 1, wherein the acid is selected from the group consisting of an organic acid, a mineral acid, and any combination thereof.

8. The method of claim 1, wherein the acid is present in the treatment fluid in an amount of about 1 wt % to about 28 wt % of the treatment fluid.

9. The method of claim 1, wherein the treatment fluid further comprises a nonmetal-based corrosion intensifier present in the treatment fluid in an amount of about 0.2 wt % to about 10 wt % of the treatment fluid.

10. A system comprising: a pump fluidly coupled to a tubular, the tubular extending into a wellbore drilled through a subterranean formation and containing a treatment fluid, the treatment fluid comprising: a base fluid; an acid; a terpene corrosion intensifier; and a multifunctional waste additive (MWA) consisting of a cellulose extract derived by solvent extraction of a plurality of cigarette filter waste, wherein the treatment fluid excludes a metal-based corrosion intensifier, and wherein the treatment fluid is capable of reducing a corrosion rate of a metal surface by at least about 50% to about 90%, as compared to a corresponding treatment fluid excluding the MWA.

11. The system of claim 10, wherein the solvent is selected from the group consisting of ethanol, methanol, isopropyl alcohol, glycerol, propylene glycol, polyethylene glycol, n-hexane, dichloromethane, trichloromethane, fresh water, distilled water, purified wastewater, purified produced water, an azeotrope, a supercritical fluid, or any combination thereof.

12. The system of claim 10, wherein the solvent has a purity of about 70% to about 100%.

13. The system of claim 10, wherein the MWA comprising the cellulose extract derived by contacting the plurality of cigarette filter waste with the solvent is prepared by an extraction process selected from the group consisting of mechanical extraction, percolation extraction, azeotrope fluid extraction, supercritical fluid extraction, soaking extraction, Soxhlet extraction, and any combination thereof.

14. The system of claim 10, wherein the MWA consisting of the cellulose extract derived by contacting the plurality of cigarette filter waste with the solvent is prepared at a temperature of about 100° F. to about 650° F.

15. The system of claim 10, wherein the MWA is present in the treatment fluid in an amount of about 1 gpt to about 100 gpt of the treatment fluid.

16. The system of claim 10, wherein the acid is selected from the group consisting of an organic acid, a mineral acid, and any combination thereof.

17. The system of claim 10, wherein the acid is present in the treatment fluid in an amount of about 1 wt % to about 28 wt % of the treatment fluid.

18. The system of claim 10, wherein the treatment fluid further comprises a nonmetal-based corrosion intensifier present in the treatment fluid in an amount of about 0.2 wt % to about 10 wt % of the treatment fluid.

19. A method comprising:
preparing a multifunctional waste additive (MWA) consisting of a cellulose extract derived by contacting a plurality of cigarette filter waste with a solvent;
preparing a treatment fluid comprising:
 a base fluid;
 an acid;
 and
 the MWA,
  wherein each of the MWA and the treatment fluid exclude a metal-based corrosion intensifier; and
introducing the treatment fluid into a wellbore drilled through a subterranean formation comprising a hydrogen sulfide gas or a precursor thereof; and
contacting the treatment fluid with the hydrogen sulfide gas or the precursor thereof during the introducing, thereby scavenging at least a portion of the contacted hydrogen sulfide gas or any hydrogen sulfide gas generated by the contacted precursor thereof, wherein the scavenging efficiency of the method is about 2 times to about 99 times the scavenging efficiency of a corresponding method excluding the MWA.

20. The method of claim 19, wherein the treatment fluid further comprises a nonmetal-based corrosion intensifier present in the treatment fluid in an amount of about 0.2 wt % to about 10 wt % of the treatment fluid.

* * * * *